US012768471B2

(12) United States Patent
Bertényi et al.

(10) Patent No.: US 12,768,471 B2
(45) Date of Patent: Oct. 20, 2026

(54) VALVE ASSEMBLY

(71) Applicant: Rheenergise Limited, London (GB)

(72) Inventors: Tamás Bertényi, Montreal (CA); Christian Porowski, Montreal (CA); Marc-Antoine Proulx, Saint-Basile-le-Grand (CA)

(73) Assignee: Rheenergise Limited, London (GB)

(*) Notice: Subject to any disclaimer, the term of this patent is extended or adjusted under 35 U.S.C. 154(b) by 0 days.

(21) Appl. No.: 18/838,701

(22) PCT Filed: Feb. 22, 2023

(86) PCT No.: PCT/IB2023/051617
§ 371 (c)(1),
(2) Date: Aug. 15, 2024

(87) PCT Pub. No.: WO2023/161815
PCT Pub. Date: Aug. 31, 2023

(65) Prior Publication Data

US 2025/0237310 A1 Jul. 24, 2025

(30) Foreign Application Priority Data

Feb. 23, 2022 (GB) ..................................... 2202467

(51) Int. Cl.

| | |
|---|---|
| ***F16K 47/08*** | (2006.01) |
| ***F03B 11/00*** | (2006.01) |
| ***F03B 13/06*** | (2006.01) |
| ***F16K 3/24*** | (2006.01) |
| ***F16K 5/04*** | (2006.01) |
| ***F16K 47/04*** | (2006.01) |

(52) U.S. Cl.
CPC ............ *F16K 47/08* (2013.01); *F03B 11/004* (2013.01); *F03B 13/06* (2013.01); *F16K 3/24* (2013.01);

(Continued)

(58) Field of Classification Search
CPC .......... F16K 47/08; F16K 3/24; F16K 5/0407; F16K 5/0414; F16K 47/045; F03B 11/004;

(Continued)

(56) References Cited

U.S. PATENT DOCUMENTS 4,041,982 A * 8/1977 Lindner .................. F16K 47/14
137/625.37
4,125,129 A * 11/1978 Baumann ................ F16K 47/04
137/625.37

(Continued)

FOREIGN PATENT DOCUMENTS

WO 2016106096 A2 6/2016

OTHER PUBLICATIONS

European Patent Office, International Search Report, Application No. PCT/IB2023/051617, mailed Jun. 16, 2023, 3 pages.

*Primary Examiner* — Dustin T Nguyen
(74) *Attorney, Agent, or Firm* — Ziegler IP Law Group, LLC.

(57) ABSTRACT

A valve assembly for controlling the flow of a fluid therethrough includes an inlet for receiving a fluid, a cage in fluid connection with the inlet, and a plug. The cage includes a first portion including a first port arranged in a wall of the cage for allowing fluid flow therethrough in a first mode of operation, and a second portion including a second port arranged in a wall of the cage for allowing fluid flow therethrough in a second mode of operation. The second port is arranged to increase turbulation when the fluid flows through the second port in the second mode of operation relative to when the fluid flows through the first port in the first mode of operation. The plug is arranged to cooperate with, and be moveable relative to, the cage between the first and second modes of operation.

5 Claims, 8 Drawing Sheets

(52) U.S. Cl.
CPC .......... *F16K 5/0407* (2013.01); *F16K 5/0414* (2013.01); *F16K 47/045* (2013.01); *F05B 2210/00* (2013.01); *F05B 2210/30* (2013.01); *Y02E 10/20* (2013.01)

(58) Field of Classification Search
CPC .. F03B 13/06; F05B 2210/00; F05B 2210/30; Y02E 10/203
See application file for complete search history.

(56) References Cited

U.S. PATENT DOCUMENTS

| | | | | | |
|---|---|---|---|---|---|
| 4,249,574 | A * | 2/1981 | Schnall | F15C 1/02 | |
| | | | | 137/625.37 | |
| 4,471,809 | A | 9/1984 | Thomsen et al. | | |
| 8,141,586 | B2 * | 3/2012 | Stepanov | F16K 47/10 | |
| | | | | 137/625.33 | |
| 9,587,764 | B2 * | 3/2017 | Juhnke | F16K 3/24 | |
| 10,443,759 | B2 * | 10/2019 | McCarty | F16K 3/24 | |
| 11,353,139 | B1 * | 6/2022 | Mann, III | F16K 47/14 | |
| 2012/0181472 | A1 * | 7/2012 | Cheng | F16K 47/04 | |
| | | | | 251/367 | |
| 2016/0010754 | A1 * | 1/2016 | Minnock | F16K 3/246 | |
| | | | | 251/309 | |
| 2017/0234440 | A1 * | 8/2017 | Detmers | F16K 3/34 | |
| | | | | 251/118 | |
| 2018/0010696 | A1 * | 1/2018 | Wang | F16K 39/024 | |
| 2019/0331084 | A1 | 10/2019 | Fridrich | | |
| 2021/0108739 | A1 * | 4/2021 | Samy | F16K 39/022 | |
| 2024/0209959 | A1 * | 6/2024 | Yates | F16K 47/04 | |
| 2025/0327534 | A1 * | 10/2025 | Li | F16K 47/08 | |

* cited by examiner

VALVE ASSEMBLY

TECHNICAL FIELD

This invention relates to fluid control valves. In particular, though not exclusively, this invention relates to a valve assembly for controlling the flow of a fluid therethrough and to a system for storing energy comprising the valve assembly.

BACKGROUND

Energy storage at grid scale is well established in the form of Pumped Hydro Storage (PHS) systems. In such systems, during times of low on-grid electricity demand, water is typically pumped from a lower-level reservoir to an upper-level reservoir, thereby gaining potential energy. The water is then stored in the upper-level reservoir until times of high on-grid electricity demand. At such times, the water is allowed to flow from the upper reservoir back to the lower reservoir through a penstock. The water turns a turbine located in the penstock to generate electricity that is sent to the grid to help meet the high electricity demand.

More recently, alternative fluids to water have been investigated for use in PHS systems. It has been found that the use of high-density fluids, i.e. fluids having a density greater than that of water at the same temperature and pressure, can be highly beneficial in PHS. For example, the use of high-density fluids in PHS systems can reduce the requirement for vertical elevation between the upper and lower-level reservoirs compared to conventional PHS systems that use water.

Suitable high-density fluids for use in PHS systems may comprise a suspension of mineral particles and a surfactant in a solvent such as water. However, it has been found that despite the presence of the surfactant, sooner or later settling and sedimentation can occur if the high-density fluid remains stationary in the PHS system for long enough periods of time. It can therefore be necessary to agitate or mix the high-density fluid to re-suspend the mineral particles.

However, a drawback with mixing the high-density fluid is that, because high-density fluids typically have a relatively high viscosity relative to water, significant hydrostatic energy loss may be observed when the high-density fluid flows through the penstock and interacts with the turbine. In fact, viscous losses due to turbulation of the fluid can directly translate into reduced performance of the PHS system, thus making the mixing undesirable. Moreover, mixing may also potentially lead to increased erosion of components inside the PHS system.

It is an object of the invention to address at least one of the above problems, or another problem associated with the prior art.

SUMMARY OF THE INVENTION

A first aspect of the invention provides a valve assembly for controlling the flow of a fluid therethrough. The valve assembly comprises an inlet for receiving a fluid, a cage in fluid connection with the inlet, and a plug. The cage comprises a first portion comprising a first port arranged in a wall of the cage for allowing fluid flow therethrough in a first mode of operation, and a second portion comprising a second port arranged in a wall of the cage for allowing fluid flow therethrough in a second mode of operation. The second port is arranged to increase turbulation of the fluid when the fluid flows through the second port in the second mode of operation relative to when the fluid flows through the first port in the first mode of operation. The plug is arranged to cooperate with, and be moveable relative to, the cage between the first mode of operation and the second mode of operation.

Thus, the claimed valve assembly advantageously provides two modes of operation that turbulate the fluid flowing therethrough to differing extents. In the context of energy storing systems, for example such as PHS systems, when mixing of the high-density fluid is not required, such as when the system is in frequent use, the valve assembly can be used in the first mode of operation (i.e. "control mode"). This may advantageously permit the flow of the high-density fluid through the valve assembly with minimal turbulation, thereby having minimal impact on the performance of the system to generate energy.

When settling and sedimentation of the high-density fluid has occurred, for example if the high-density fluid has remained stationary in the PHS system for a significant period of time, the valve assembly can be used in the second mode of operation (i.e. "enhanced mixing mode") to intentionally turbulate the high-density fluid as it flows through the valve assembly. Such turbulation may advantageously restore the desired rheological properties of the high-density fluid. However, the trade-off is that such turbulation may also result in a loss of momentum and loss in pressure of the high-density fluid as it flows through the penstock and interacts with the turbine, thereby resulting in reduced performance of the system to generate energy.

As mentioned above, the second port is arranged to increase turbulation (i.e. turbulence or turbulent flow) of the fluid when the fluid flows through the second port in the second mode of operation relative to when the fluid flows through the first port in the first mode of operation. The term "increased turbulation" refers to increased mixing of the fluid, and may be characterised by one or more of increased irregularity, diffusivity, rationality, or dissipation of the fluid. Additionally, or alternatively, increased turbulation may be characterised by an increase in rate of chaotic changes in pressure and/or flow velocity of the fluid.

For example, the second port may be arranged to increase the Reynolds number of the fluid when the fluid flows through the second port in the second mode of operation relative to when the fluid flows through the first port in the first mode of operation. The Reynolds number defines the ratio of inertial forces to viscous forces occurring within a fluid flow.

In some embodiments, the second port may be arranged to increase the turbulence intensity (TI) of the fluid when the fluid flows through the second port in the second mode of operation relative to when the fluid flows through the first port in the first mode of operation. Turbulence intensity builds on the idea that turbulent flow can be decomposed into two components: a mean velocity ($\overline{u}$) and a fluctuation velocity ($u'$). In order to calculate the turbulence intensity of a fluid, a series of measurements of the velocity of the fluid are taken at a given time interval. The turbulence intensity value may suitably be calculated based on a time interval of one or two seconds. In some embodiments, the turbulence intensity value may be calculated based on a time interval of ten seconds.

The velocity of the fluid may suitably be measured using one or more of a hot-wire probe, a hot film probe, a static pressure probe and a pressure transducer. Additionally, or alternatively, the velocity of the fluid may be measured using 2D or 3D ultrasound to non-invasively scan a plane or volume in a flow field of the fluid.

The mean velocity $(\bar{u})$ is then calculated and subtracted from the series of measurements of velocity. The resultant values are the fluctuation velocities. The fluctuation velocity (u') component is calculated as a root-mean-square (RMS) value of the fluctuation velocities. The turbulence intensity is then defined as the ratio of $(u')/(\bar{u})$. Turbulence intensity is therefore dimensionless and scales from 0 to 1 but is typically expressed as a percentage.

Suitably, in the first mode of operation, the turbulence intensity of the fluid flowing through the valve assembly may be 5% or less. For example, in the first mode of operation, the turbulence intensity of the fluid flowing through the valve assembly may be 6% or less, or 7% or less, or 8% or less, or 9% or less, or 10% or less, or even 15% or less.

Suitably, in the second mode of operation, the turbulence intensity of the fluid flowing through the valve assembly may be 15% or more. For example, in the first mode of operation, the turbulence intensity of the fluid flowing through the valve assembly may be 16% or more, or 17% or more, or 18% or more, or 19% or more, or 20% or more, or even 25% or more.

The term "port" refers to an aperture or opening that extends through the wall of the cage.

Suitably, in the first mode of operation, the plug may be blocking the second port. For example, in the first mode of operation, the plug may be blocking the second port such that fluid flow may be substantially impeded through the second port.

Suitably, in the second mode of operation, the plug may be blocking the first port. For example, in the second mode of operation, the plug may be blocking the first port such that fluid flow may be substantially impeded through the first port.

In some embodiments, in the second mode of operation, the plug may be only partially blocking the first port. In some embodiments, the plug may be blocking none (i.e. neither) of the first and second ports.

In a third mode of operation, the plug may be blocking both the first and second ports. For example, in the third mode of operation, the plug may be blocking the first and second ports such that fluid flow may be substantially impeded through the first and second ports.

The valve assembly may comprise a cage in fluid connection with the inlet, the cage comprising a first portion comprising a first port arranged in a wall of the cage for allowing fluid flow therethrough in a first mode of operation, and a second portion comprising a second port arranged in a wall of the cage for allowing fluid flow therethrough in a second mode of operation. The second port may be arranged to increase turbulation of a fluid flowing through the second port in the second mode of operation relative to a fluid flowing through the first port in the first mode of operation.

Suitably, the plug may be arranged to cooperate with, and be moveable relative to, the cage between the first mode of operation in which the plug is blocking the second port, and the second mode of operation in which the plug is blocking the first port.

In some embodiments, the plug may be arranged to cooperate with, and be moveable relative to, the cage between the first mode of operation in which the plug is blocking the second port, and the second mode of operation in which the plug is blocking none (i.e. neither) of the first and second ports.

Suitably, the plug may be arranged to cooperate with, and be moveable relative to, the cage between the first mode of operation in which the plug is blocking the second port, the second mode of operation in which the plug is blocking the first port, and a third mode in which the plug is blocking both the first and second ports.

In some embodiments, the plug may be arranged to cooperate with, and be moveable relative to, the cage between the first mode of operation in which the plug is blocking the second port, the second mode of operation in which the plug is blocking none (i.e. neither) of the first and second ports, and a third mode in which the plug is blocking both the first and second ports.

Suitably, the second port may be different in size and/or shape to the first port. In this way, the second port may be advantageously dimensioned to increase turbulation when the fluid flows through the second port in the second mode of operation relative to when the fluid flows through the first port in the first mode of operation In some embodiments, the second port may be arranged tangentially (i.e. azimuthally) with respect to the wall of the cage. For example, the second port may have an inlet and an outlet defining a flow path therebetween. The wall of the cage may have first and second opposing faces separated by a thickness (i.e. depth) of the wall. The flow path of the second port may extend through the wall at angle with respect to the first and/or second faces of the wall.

By arranging the second port tangentially with respect to the wall of the cage, the second port may advantageously induce swirling of the fluid in the valve assembly. Moreover, when the valve assembly is arranged in a system for storing energy, such swirling may advantageously propagate downstream of the valve assembly and potentially even lift sedimented solids coating any surfaces or components inside the system.

Suitably, the flow path of the second port may extend through the wall at an angle in the range of from about 10 to 80°, or in the range of from about 20 to 70°, or in the range of from about 30 to 60°, such as in the range of from about 40 to 50° along its length with respect to the first and/or second faces of the wall. For example, the second port may extend through the wall at an angle of about 45° with respect to the first and/or second faces of the wall.

In some embodiments, the first port may be arranged substantially perpendicular (i.e. about) 90° with respect to the wall of the cage. For example, the first port may have an inlet and an outlet defining a flow path therebetween. The flow path of the first port may be arranged substantially perpendicular (i.e. about) 90° with respect to the first and/or second faces of the wall. Such an arrangement may advantageously limit the ability of the first port to induce swirling of the fluid in the valve assembly.

In some embodiments, the second port may be generally curved. For example, the flow path of the second port may follow a generally curved path. In this way, the second port may advantageously induce swirling of the fluid in the valve assembly.

In some embodiments, the first port may be generally straight. For example, the flow path of the first port may follow a generally linear path. Such an arrangement may advantageously limit the ability of the first port to induce swirling of the fluid in the valve assembly.

In some embodiments, the second port may comprise a nozzle shaped structure. The presence of a nozzle shaped structure in the second port may advantageously increase turbulation when the fluid flows through the second port in the second mode of operation relative to when the fluid flows through the first port in the first mode of operation.

Suitably, the diameter of the second port may narrow in the direction of fluid flow therethrough. For example, the diameter of the second port may narrow in the direction of fluid flow therethrough from a first diameter to a second diameter. Thus, the first diameter may be larger (i.e. wider) than the second diameter. In this way, the flow of fluid may be accelerated through the second port resulting in increased pressure and/or flow velocity of the fluid in the valve assembly.

In some embodiments, the second port may be arranged to separate the flow of fluid therethrough into a plurality of streams of fluid. For example, the second port may have a single inlet and a plurality of outlets. Suitably, the second port may be arranged to separate the flow of fluid therethrough into two, three, four, five, six, seven, eight, nine or even ten streams. In some embodiments, the second port may be arranged to separate the flow of fluid therethrough into more than ten streams.

In this way, the plurality of streams of fluid may collide as they reunite in the valve assembly, thereby increasing turbulation when the fluid flows through the second port in the second mode of operation relative to when the fluid flows through the first port in the first mode of operation.

Suitably, the second port may comprise one or more baffles. For example, the second port may comprise one or more flow obstructing vanes and/or panels. The presence of once or more baffles in the second port may advantageously increase turbulation of the fluid flowing therethrough.

In some embodiments, the first portion may comprise a plurality of first ports. Suitably, each of the plurality of first ports may be of generally the same size and/or shape.

In some embodiments, the second portion may comprise a plurality of second ports. Suitably, each of the plurality of second ports may be of generally the same size and/or shape.

In some embodiments, the cage may be generally cylindrical. Suitably, the plug may be arranged generally concentrically with respect to the cage.

In some embodiments, the plug may be arranged inside the cage.

In some embodiments, the plug may be arranged outside the cage.

In some embodiments, the plug may be arranged to be moved linearly relative to the cage.

In some embodiments, the plug may be arranged to be moved rotatably relative to the cage.

In some embodiments, the plug may comprise a peripheral wall arranged to engage with the cage.

Suitably, the peripheral wall may comprise a first portion comprising a first port arranged in the peripheral wall for allowing fluid flow therethrough in the first mode of operation.

Suitably, the peripheral wall may comprise a second portion comprising a second port arranged in the peripheral wall for allowing fluid flow therethrough in the second mode of operation.

In the first mode of operation, the first port of the peripheral wall may be at least partially aligned with the first port of the cage. Suitably, in the first mode of operation, the second port of the peripheral wall may be out of alignment (i.e. misaligned) with the second port of the cage such that fluid flow through the second port may be substantially blocked or impeded.

In the second mode of operation, the second port of the peripheral wall may be at least partially aligned with the second port of the cage. Suitably, in the second mode of operation, the first port of the peripheral wall may be out of alignment (i.e. misaligned) with the first port of the cage such that fluid flow through the first port may be substantially blocked or impeded.

In the third mode of operation, both the first and second ports of the peripheral wall may out of alignment with the first and second ports of the cage. In this way, fluid flow through the first and second ports may be substantially blocked or impeded.

Suitably, the first port of the peripheral wall may be the same shape and/or size as the first port of the cage.

Suitably, the second port of the peripheral wall may be the same shape and/or size as the second port of the cage.

In some embodiments, the valve assembly may comprise an outlet in fluid connection with the cage for discharging fluid from the valve assembly. In such cases where the cage is generally cylindrical, the outlet may suitably be arranged to discharge fluid from inside of the cage.

A second aspect of the invention provides a system for storing energy comprising a valve assembly according to the first aspect of the invention.

In some embodiments, the system may be a pumped hydro storage (PHS) system.

For example, the system may comprise upper and lower reservoirs, a working fluid, and a conduit arranged to permit flow of the working fluid from the upper reservoir to the lower reservoir under gravity. The conduit may suitably comprise a turbine generator arranged to be driven by the flow of the working fluid through the conduit to generate energy, for example such as electrical and/or mechanical energy.

In some embodiments, the working fluid may have a specific gravity with respect to water in the range of from 1.4 to 3.0. For example, the working fluid may have a specific gravity with respect to water in the range of from 1.8 to 2.8.

In some embodiments, the working fluid may comprise mineral particles and a surfactant. For example, the working fluid may comprise a suspension of mineral particles and a surfactant in a solvent such as water.

In some embodiments, the valve assembly may be arranged in the conduit. Suitably, the valve assembly may be arranged in the conduit between the upper reservoir and the turbine generator.

In some embodiments, the system may comprise a pump arranged to transfer the working fluid from the lower reservoir to the upper reservoir. The pump may suitably be arranged in the conduit.

Additionally, or alternatively, the turbine generator may be arranged to be driven in reverse to transfer the working fluid from the lower reservoir to the upper reservoir. For example, the turbine generator may be arranged to be driven in reverse using electrical energy to transfer the working fluid from the lower reservoir to the upper reservoir. Suitably, the turbine generator may comprise a reversible pump-turbine arranged to be driven in reverse using electrical energy to transfer the working fluid from the lower reservoir to the upper reservoir. The electrical energy may suitably come from an electricity supply grid connected to the system.

Throughout the description and claims of this specification, the words “comprise” and “contain” and variations of the words, for example “comprising” and “comprises”, mean “including but not limited to”, and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
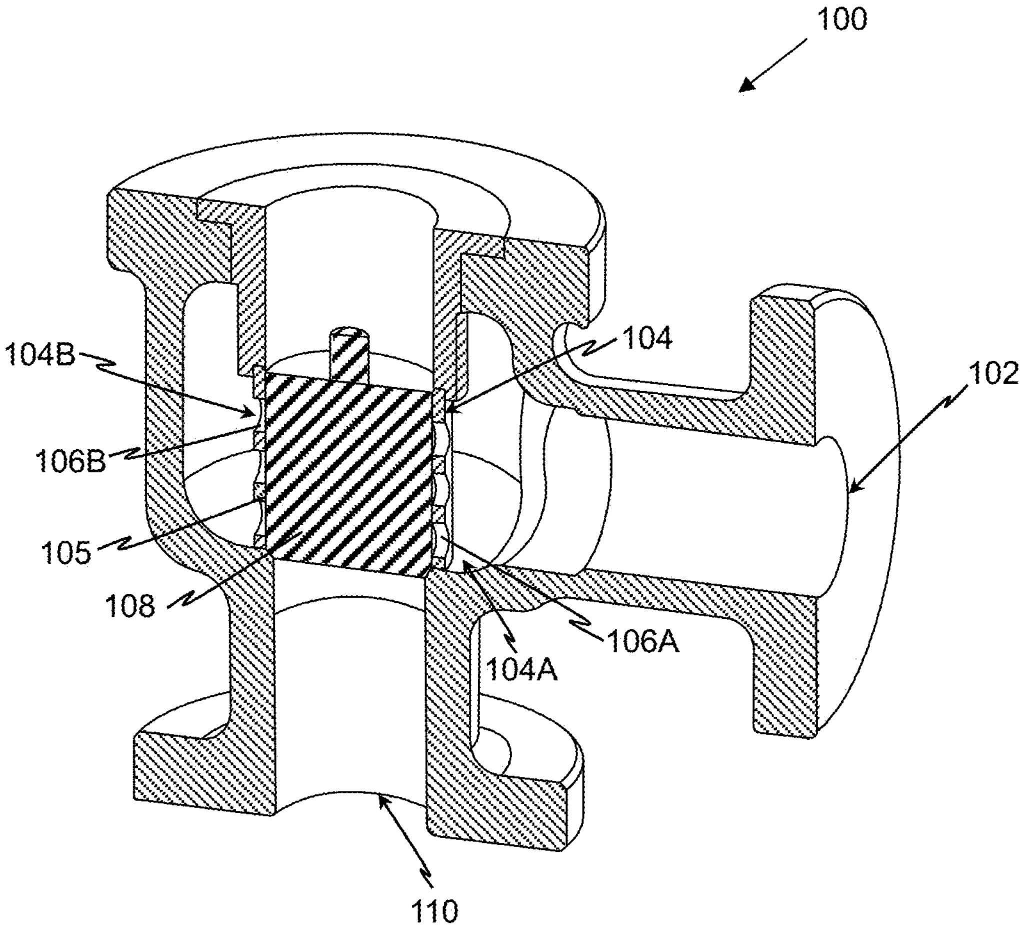
FIG. 1 illustrates a perspective sectional view of a valve assembly for controlling the flow of a fluid therethrough in accordance with a first embodiment of the invention.

FIG. 1 shows a perspective sectional view of a valve assembly 100 for controlling the flow of a fluid therethrough in accordance with a first embodiment of the invention. The valve assembly 100 comprises an inlet 102 for receiving a fluid. The valve assembly 100 further comprises a cylindrical cage 104 in fluid connection with the inlet 102. Additionally, the valve assembly 100 has an outlet 110 for discharging fluid from the valve assembly 100.

The lower half of the cage 104 defines a first portion 104A comprising a plurality of first ports 106A arranged in a wall 105 of the cage 104 for allowing fluid flow therethrough. The upper half of the cage 104 defines a second portion 104B comprising a plurality of second ports 106B arranged in the wall 105 of the cage 104 for allowing fluid flow therethrough. The plurality of second ports 106B are arranged to increase turbulation of the fluid when it flows through the plurality of second ports 106B compared to when it flows through the plurality of first ports 106A, as will be explained in more detail below.

The valve assembly 100 further comprises a cylindrical plug 108 arranged inside the cage 104. In an initial position (i.e. the off or closed position), the plug 108 abuts both the first and second portions 104A, 104B of the cage 104, thereby preventing the flow of fluid through the valve assembly 100.

In a first mode of operation (i.e. "control mode"), the plug is moved upwards from the initial position to a first position in which it abuts only the second portion 104B of the cage 104. In this way, fluid is able to flow through the plurality of first ports 106A, but not through the plurality of second ports 106B.

In a second mode of operation (i.e. "enhanced mixing mode"), the plug is moved upwards from the first position to a second position in which it no longer abuts the cage 104, and so does not abut either of the first and second portions 104A, 140B. In this way, fluid is able to flow through both the plurality of first and ports 106A and the plurality of second ports 106B, thereby increasing turbulation of the fluid flowing through valve assembly 100 in the second mode of operation relative to in the first mode of operation.

Figure 2A:
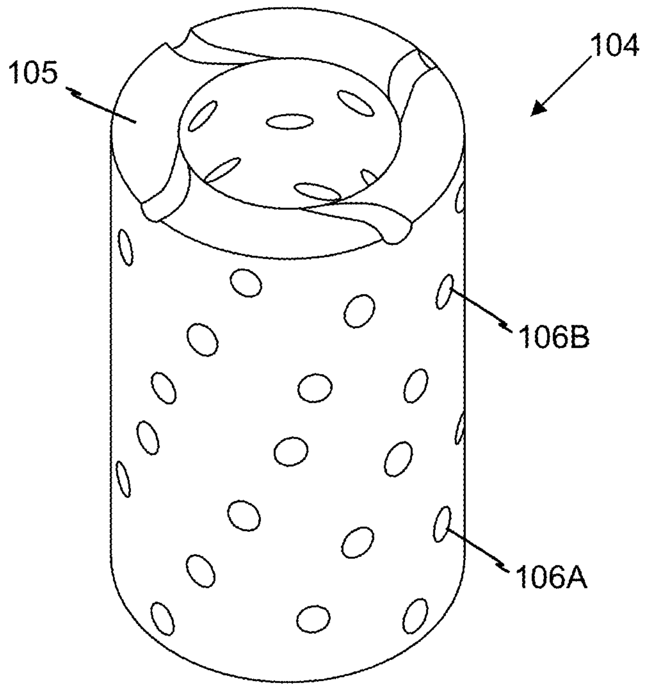
FIG. 2A illustrates a perspective view of a cage of a valve assembly in accordance with a first embodiment of the invention.
Figure 2B:
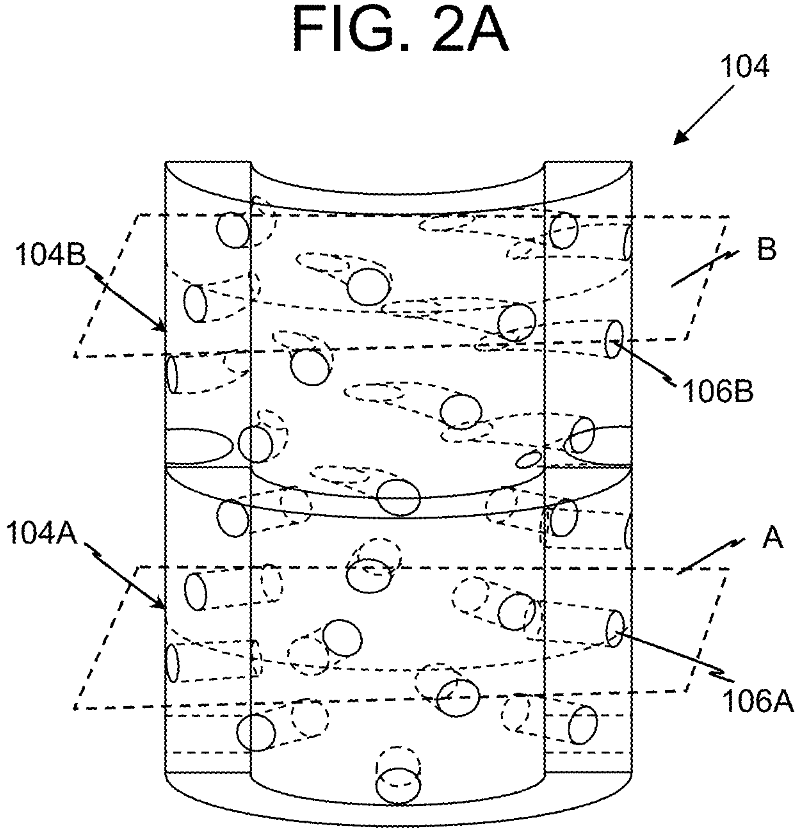
FIG. 2B illustrates a partial perspective view of the cage of a valve assembly in accordance with a first embodiment of the invention.
Figure 3A:
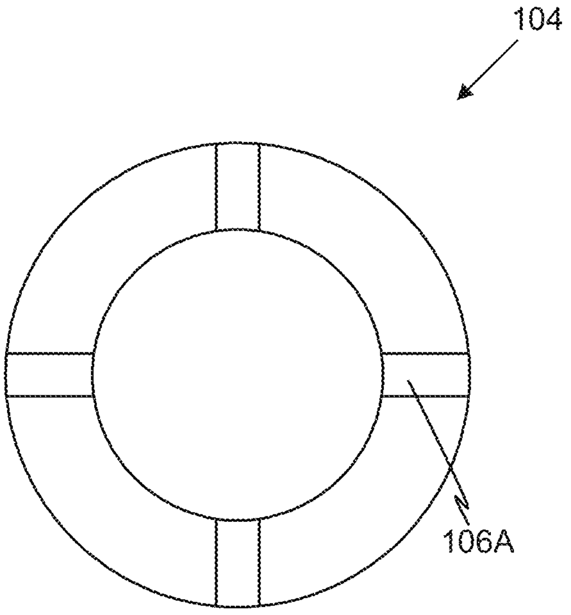
FIG. 3A illustrates a cross-sectional view of the cage along a plane A of FIG. 2B.
Figure 3B:
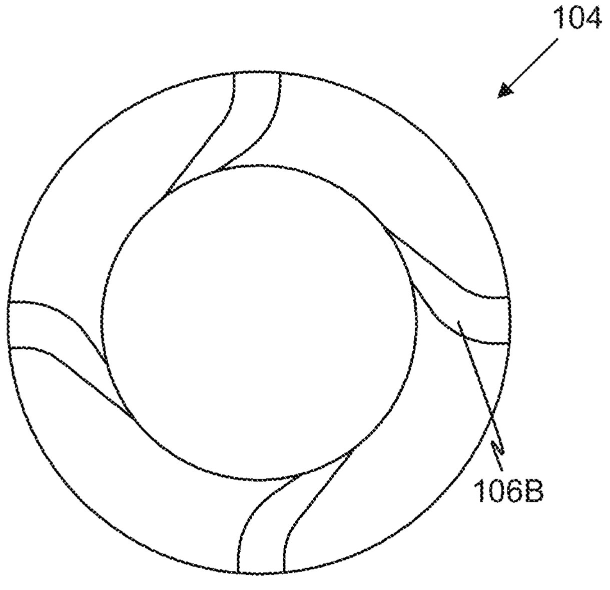
FIG. 3B illustrates a cross-sectional view of the cage along a plane B of FIG. 2B.

FIGS. 2A and 2B illustrate perspective views of the cage 104 employed in the valve assembly 100. FIGS. 3A and 3B illustrate cross-sectional views of the cage 104 along planes A and a plane B of FIG. 2B respectively. The cage 104 has a wall 105 defining an elongate cylinder. The lower half of the cylinder defines the first portion 104A of the cage 104 and the upper half of the cylinder defines the second portion 104B.

The first portion 104A comprises a plurality of first ports 106A that pass through the wall 105 of the cage 104 for allowing fluid flow therethrough in the first mode of operation. Each of the plurality of first ports 106A is straight (i.e. follows a linear path through the wall 105) and is arranged generally perpendicular (i.e. about) 90° with respect to the wall 105 at the point through which it passes.

The second portion 104B comprises a plurality of second ports 106B that pass through the wall 105 of the cage 104 for allowing fluid flow therethrough in the second mode of operation. Each of the plurality of second ports 106B is arranged tangentially with respect to the wall 105 of the cage 104. In this way, the plurality of second ports 106B advantageously induce swirling of fluid flowing through the valve assembly 100 in the second mode of operation. This increases turbulation of the fluid flowing through valve assembly 100 in the second mode of operation relative to in the first mode of operation.

FIGS. 4A to 4D illustrate different modes of operation of the valve assembly 100. Translational movement of the plug 108 inside the cage 104 allows the different modes of operation to be implemented.

Figure 4A:
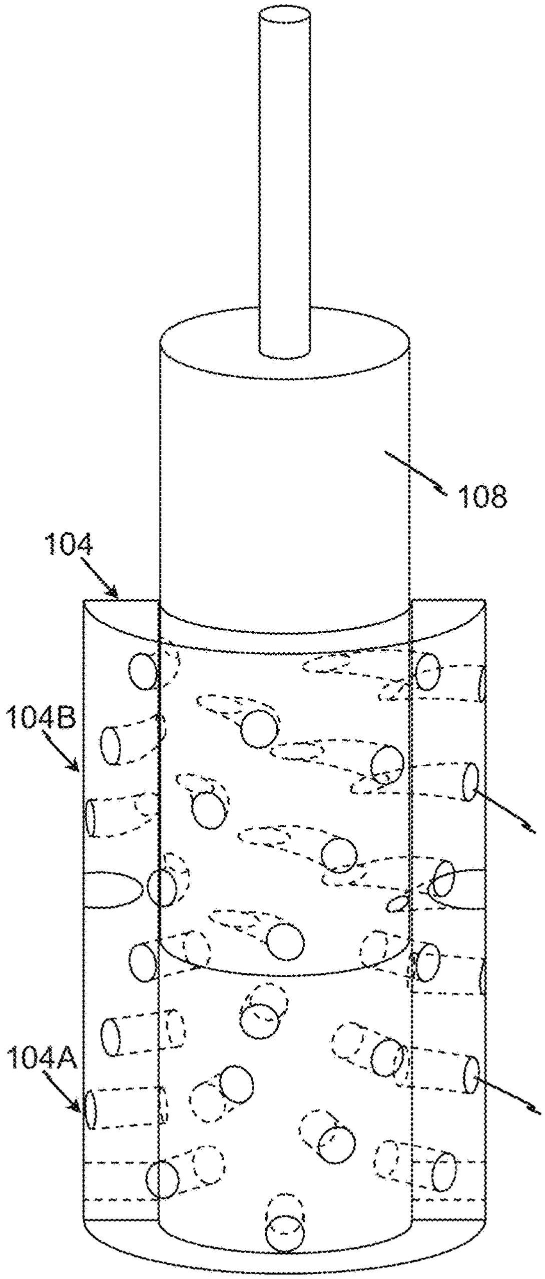
FIGS. 4A to 4D illustrate different mode of operations of a valve assembly in accordance with a first embodiment of the invention.

FIG. 4A shows a first (i.e. "control") mode of operation, in which the plug 108 covers the plurality of second ports 106B, but does not cover the plurality of first ports 106A. In this way, fluid is able to flow through the plurality of first ports 106A, but not through the plurality of second ports 106B. Since each of the plurality of first ports 106A are straight and arranged generally perpendicular with respect to the wall 105, turbulation of the fluid passing through the plurality of first ports 106A is minimised. The first mode of operation therefore provides for "controlled" flow of the fluid through the valve assembly 100. Thus, in the first mode of operation, the valve assembly 100 behaves similarly to a conventional fluid control valve.

Figure 4B:
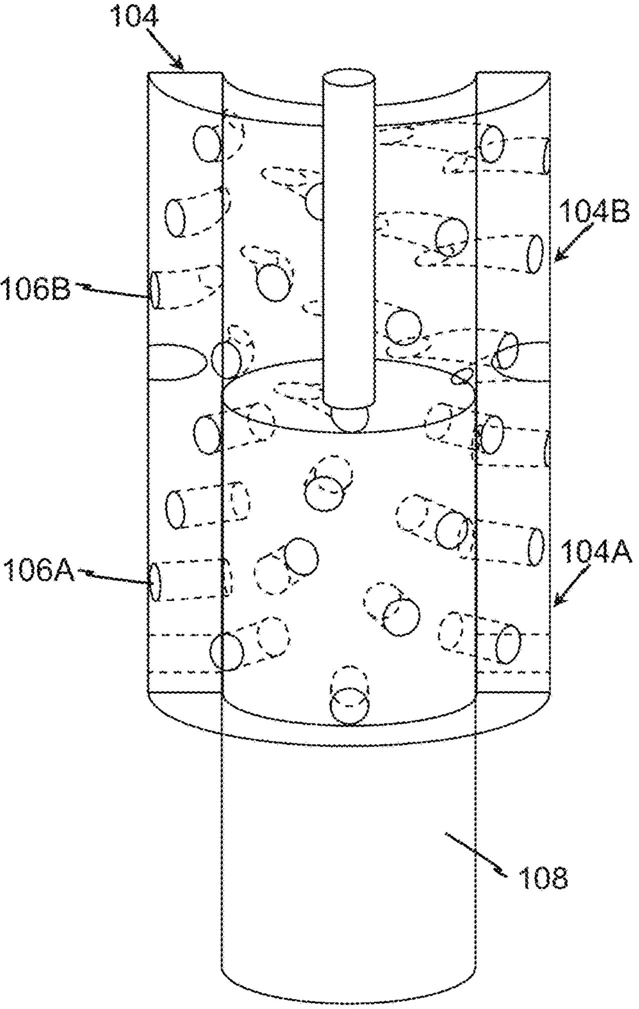
Figure 4C:
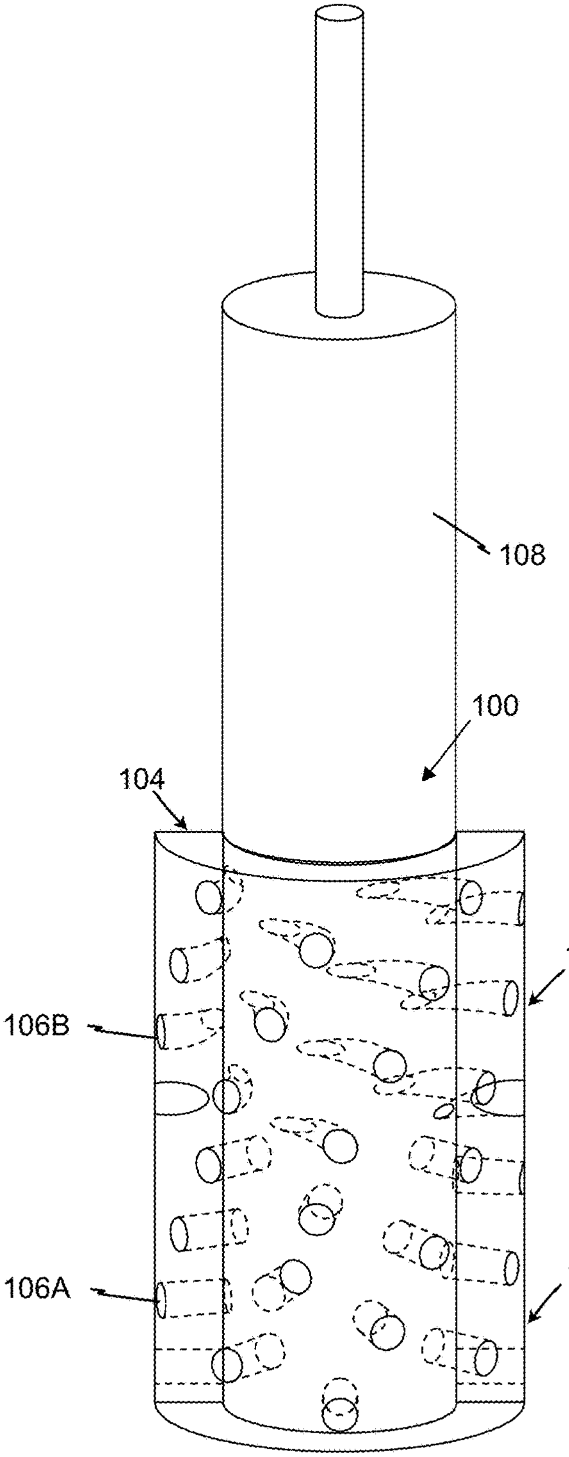

FIGS. 4B and 4C show two different ways in which the second (i.e. "enhanced mixing") mode of operation can be implemented. Referring to FIG. 4B, the second mode of operation can be implemented in a first way by translational movement of the plug 108 to a position in which the plug 108 covers the plurality first ports 106A, but does not cover the plurality of second ports 106B. Referring to FIG. 4C, the second mode of operation may be implemented in a second way by translational movement of the plug 108 to a position in which the plug 108 is no longer inside the cage 104, and so does not cover either of the plurality of first and second ports 106A, 106B (as was described above in relation to FIG. 1).

Since each of the plurality of second ports 106B is arranged tangentially with respect to the wall 105 of the cage 104, the second ports 106B induce swirling of fluid flowing through the valve assembly 100 with respect to fluid flowing through the plurality of first ports 106A. The plurality of second ports 106B therefore increases turbulation of the fluid flowing through the plurality of second ports 106B compared to when the fluid flows through the plurality of first ports 106A. Thus, turbulation of the fluid flowing through the valve assembly 100 is increased in the second mode of operation relative to in the first mode of operation.

Figure 4D:
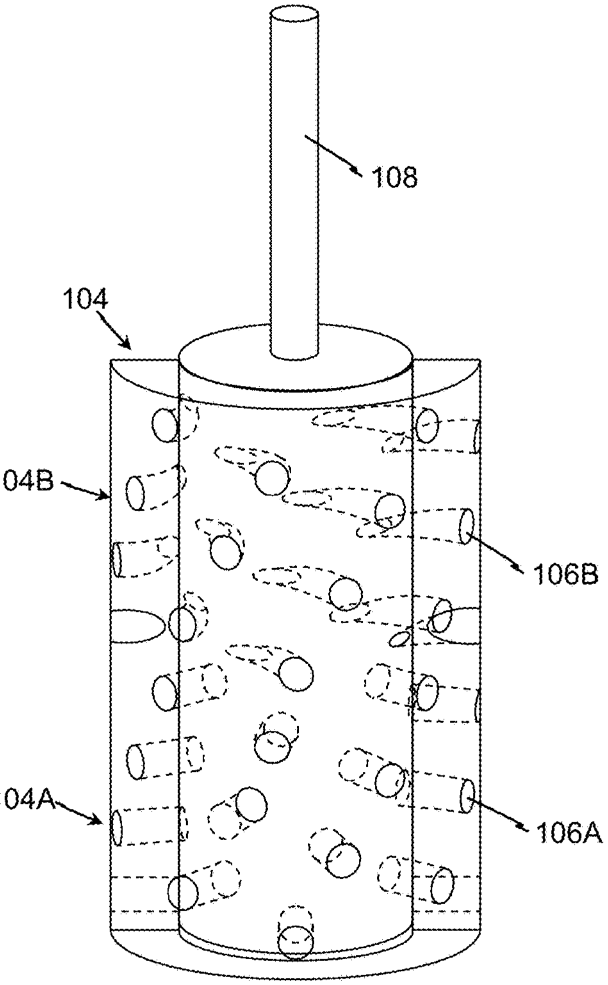

FIG. 4D shows a third (i.e. off or closed) mode of operation, in which the plug is arranged to cover both the plurality first ports 106A and the plurality of second ports 106B, thereby prohibiting the flow of fluid through the valve assembly 100.

Figure 5A:
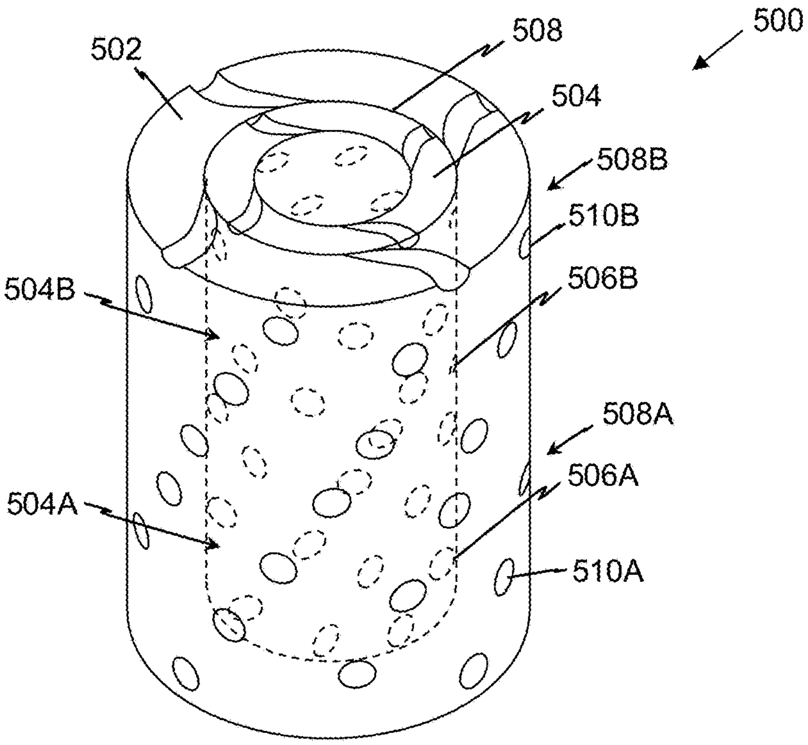
FIGS. 5A to 5C illustrate perspective views of a cage and plug in accordance with a second embodiment of the invention in different modes of operation.
Figure 5B:
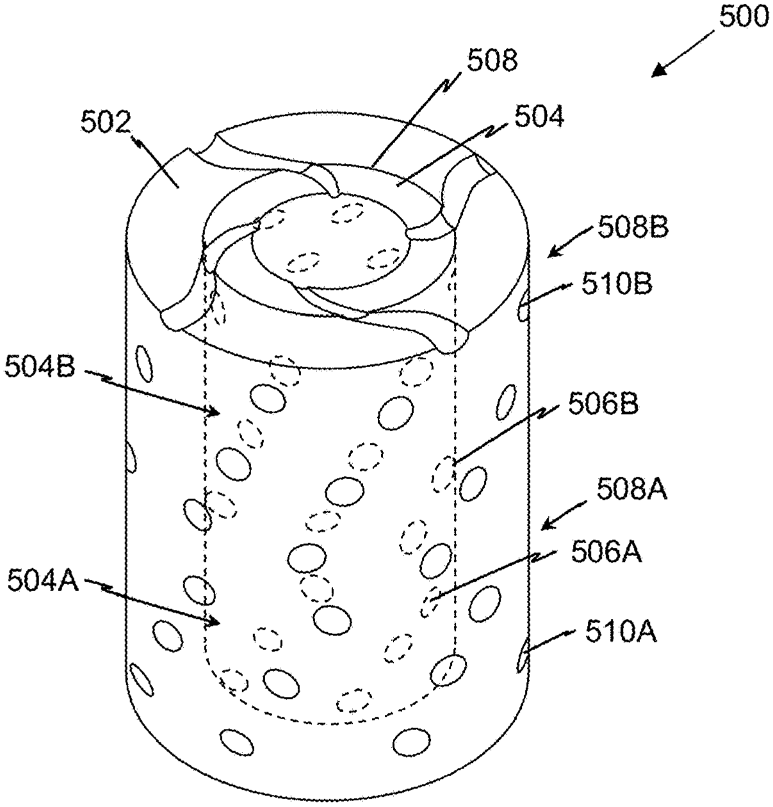
Figure 5C:
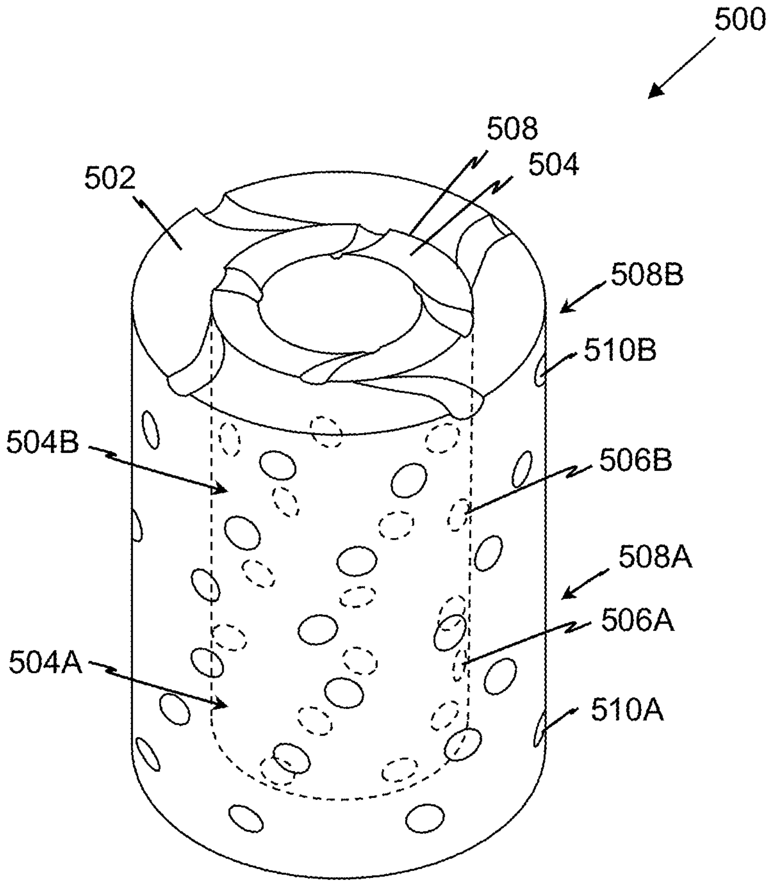

FIGS. 5A to 5C illustrate perspective views of a plug 502 and a cage 504 arrangement 500 in accordance with a second embodiment of the invention. The plug 502 is arranged concentrically outside of the cage 504 such that it can be moved rotatably relative to the cage 504 to provide different modes of operation of the arrangement 500.

The lower half of the cage 504 defines a first portion 504A comprising a plurality of first ports 506A arranged in a wall 505 of the cage 504 for allowing fluid flow therethrough. The upper half of the cage 504 defines a second portion 504B comprising a plurality of second ports 506B arranged in the wall 505 of the cage 504 for allowing fluid flow therethrough. The plurality of first ports 506A are straight and arranged generally perpendicular with respect to the wall 505. The plurality of second ports 506B are arranged tangentially with respect to the wall 505. In this way, the plurality of second ports 506B increase turbulation of a fluid flowing therethrough relative to the plurality of first ports 506A.

The plug 502 comprises a peripheral wall 508 arranged to engage with the cage 504. The lower half of the peripheral wall 508 defines a first portion 508A comprising a plurality of first ports 510A that pass through the plug 502, for allowing fluid flow therethrough in a first mode of operation. The upper half of the peripheral wall 508 defines a second portion 508B comprising a plurality of second ports 510B that pass through the plug 502, for allowing fluid flow therethrough in a second mode of operation. The plurality of first ports 510A are straight and arranged generally perpendicular with respect to the peripheral wall 508. The plurality of second ports 510B are arranged tangentially with respect to the peripheral wall 508. In this way, the plurality of second ports 510B increase turbulation of a fluid flowing therethrough relative to the plurality of first ports 510A.

As shown in FIG. 5A, in a first (i.e. “control”) mode of operation, the plurality of first ports 510A of the peripheral wall 508 are aligned with the plurality of first ports 506A of the cage 504. In the first mode of operation, the plurality of second ports 510B of the peripheral wall 508 are out of alignment with the plurality of second ports 506B of the cage 504. Thus, in the first mode of operation, fluid is able to flow through the plurality of first ports 506A, but is prevented from flowing through the plurality of second ports 506B.

As shown in FIG. 5B, in a second (i.e. “enhanced mixing”) mode of operation, the plurality of first ports 510A of the peripheral wall 508 are out of alignment with the plurality of first ports 506A of the cage 504. In the second mode of operation, the plurality of second ports 510B of the peripheral wall 508 are aligned with the plurality of second ports 506B of the cage 504. Thus, in the second mode of operation, fluid is able to flow through the plurality of second ports 506B, but is prevented from flowing through the plurality of first ports 506A. Therefore, turbulation of the fluid flowing through the plug 502 and cage 504 arrangement 500 is increased in the second mode of operation relative to the first mode of operation.

FIG. 5C shows the plug 502 and cage 504 arrangement 500 in a third (i.e. off or closed) mode of operation, in which both the plurality of first ports 506A and plurality of second ports 506B of the cage 504 are out of alignment with the plurality of first ports 510A and plurality of second ports 510B of the peripheral wall 508. Thus, in the third mode of operation, the flow of fluid through the plug 502 and cage 504 arrangement 500 is completely blocked.

Figure 6:
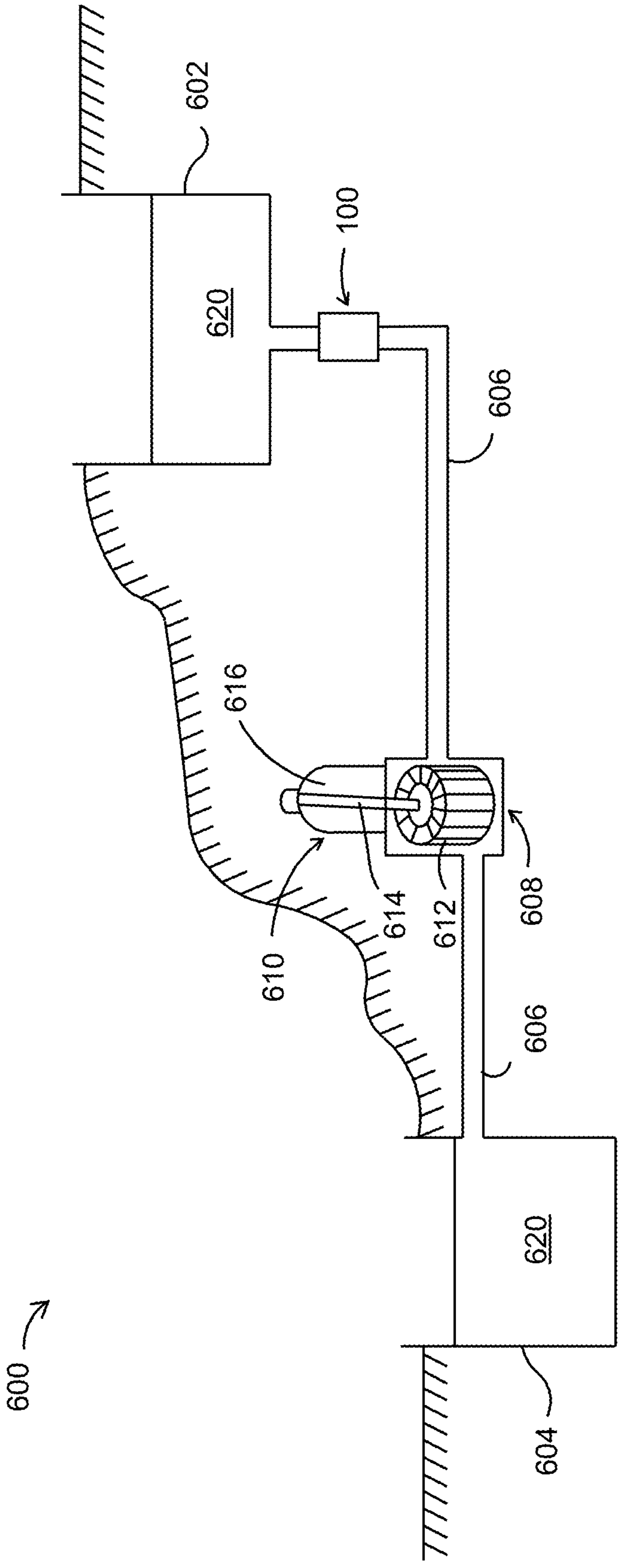
FIG. 6 illustrates a system for storing energy comprising a valve assembly in accordance with a first embodiment of the invention.

Referring to FIG. 6, a system 600 for storing energy comprising a valve assembly 100 according to a first embodiment of the invention has upper and lower reservoirs 602, 604 connected by an underground conduit 606. The conduit 606 feeds in and out of a penstock 608, which houses a turbine 612 of a turbine generator 610. The turbine generator 610 also comprises a generator unit 616 situated directly above the penstock 608. The turbine generator 610 further comprises a shaft 614, which extends vertically upwards from and connects the turbine 612 to the generator unit 616. The valve assembly 100 is situated in the conduit 606 between the upper reservoir 602 and the penstock 608. The upper and lower reservoirs 602, 604 and the conduit 606 contain a working fluid 620. In this particular example, the working fluid 620 is a slurry comprising a suspension of mineral particles and a surfactant in water.

During times of low on-grid electricity demand, or when there is an excess of electricity on-grid, the turbine 612 may be driven in reverse using electrical energy to pump the working fluid 620 through the conduit 606 from the lower reservoir 604 to the upper reservoir 602. In this way, the working fluid 620 gains potential energy. The working fluid 620 may be stored in the upper reservoir 602 until such time that the system 600 is required to generate energy, for example, at times of high on-grid electricity demand. At such times, the working fluid 620 is allowed to flow back through the conduit 606 from the upper reservoir 602 to the lower reservoir 604 through the penstock 608. The flow of the working fluid 620 through the penstock 608 rotates the turbine 612 and the shaft 614, thereby resulting in the generation of electrical energy by the generator unit 616. This electrical energy may then be sent to the electricity grid (not shown in FIG. 6) to help meet the high electricity demand.

When the system 600 is in frequent use, due to the continuous movement of the working fluid 620 between the upper and lower reservoirs 602, 604, the working fluid 620 will be sufficiently mixed to provide the desired rheological properties (for example, such as viscosity). At such times, the valve assembly 100 can be used in the first mode of operation (i.e. “control mode”). This may advantageously permit flow of the working fluid 620 through the valve assembly 100 with minimal turbulation, thereby having minimal impact on the performance of the turbine generator 610 to generate energy.

When settling and sedimentation of the working fluid 620 has occurred, for example if the working fluid 620 has remained stationary in the upper reservoir 602 for a significant period of time, the valve assembly 100 can be used in the second mode of operation (i.e. "enhanced mixing mode") to intentionally turbulate the working fluid 620 fluid as it flows therethrough. Such turbulation by the valve assembly 100 may advantageously restore the desired rheological properties of the working fluid 620.

The invention claimed is:

1. A valve assembly for controlling the flow of a fluid therethrough, comprising:

an inlet for receiving a fluid;

a cage in fluid connection with the inlet, the cage comprising:

a first portion comprising a first port arranged in a wall of the cage for allowing fluid flow therethrough in a first mode of operation; and a second portion comprising a second port arranged in a wall of the cage for allowing fluid flow therethrough in a second mode of operation, wherein the second port is arranged to increase turbulation when the fluid flows through the second port in the second mode of operation relative to when the fluid flows through the first port in the first mode of operation; and a plug arranged to cooperate with, and be moveable relative to, the cage between the first and second modes of operation, wherein the plug comprises a peripheral wall arranged to engage with the cage, the peripheral wall comprising:

a first portion comprising a first port arranged in the peripheral wall for allowing fluid flow therethrough in the first mode of operation; and a second portion comprising a second port arranged in the peripheral wall for allowing fluid flow therethrough in the second mode of operation;

wherein in the first mode of operation, the first port of the peripheral wall is at least partially aligned with the first port of the cage; and wherein in the second mode of operation, the second port of the peripheral wall is at least partially aligned with the second port of the cage.

2. The valve assembly of claim 1, wherein the first port of the peripheral wall is the same shape and/or size as the first port of the cage, and/or wherein the second port of the peripheral wall is the same shape and/or size as the second port of the cage.

3. The valve assembly of claim 1, wherein in the first mode of operation the plug blocks the second port to impede fluid flow through the second port, and wherein in the second mode of operation the plug blocks the first port to impede fluid flow through the first port.

4. The valve assembly of claim 1, wherein the plug is further moveable relative to the cage to a third mode of operation in which the plug blocks both the first port and the second port to impede fluid flow through each of the first port and the second port.

5. The valve assembly of claim 1, wherein in the first mode of operation the second port of the peripheral wall is misaligned with the second port of the cage to block fluid flow through the second port of the cage, and wherein in the second mode of operation the first port of the peripheral wall is misaligned with the first port of the cage to block fluid flow through the first port of the cage.

* * * * *